3,409,413
METHOD OF DISSOLVING ALUMINUM-CLAD
THORIA TARGET ELEMENTS
Raymond E. Burns, John F. Phillips, and Wallace W.
Schulz, Richland, Wash., assignors to the United
States of America as represented by the United
States Atomic Energy Commission
No Drawing. Filed Aug. 11, 1967, Ser. No. 660,569
5 Claims. (Cl. 23—324)

ABSTRACT OF THE DISCLOSURE

Aluminum-clad thoria target elements used for the production of uranium-233 by irradiation in a nuclear reactor are dissolved. The dissolving solution is 10 to 13 M nitric acid and contains fluoride, mercury and nickel ions. The fluoride and mercury ions together activate the aluminum so that it will dissolve in the concentrated $HNO_3$, the fluoride ion catalyzes the dissolution of thoria, and the nickel ion controls the rate of dissolution of the aluminum.

Contractual origin of the invention

This invention was made in the course of or under a contract with the United States Atomic Energy Commission.

Background

Production of U-233 requires the neutron irradiation of thorium oxide target elements held in aluminum containers. Following suitable cooling periods, the target elements are dissolved in nitric acid-hydrogen fluoride also known as Thorex Reagent, and the resulting dissolver solution is processed for recovery of U-233. The dissolution of thoria in 8 to 16 M $HNO_3$ containing fluoride ions is disclosed in U.S. Patent 2,546,933, granted Mar. 27, 1951, to Frank L. Steahly.

Prior to dissolving the target elements the aluminum containers must be removed. These containers may be removed with sodium hydroxide-sodium nitrate as is currently done for aluminum clad uranium metal. However, thoria is present in the element as loose powder, and, once declad, settles to the bottom of the dissolver as an almost impervious layer of sludge. Draining this alkaline decladding solution through the thoria sludge is difficult and time consuming, but it is necessary to remove the decladding solution prior to dissolving the target element in Thorex Reagent.

Summary of the invention

Our process involves the dissolution of the aluminum and the thoria in a single solution, which obviates the need for the draining step referred to above. Moreover, gas evolution in the aluminum dissolution serves to provide agitation which keeps the thoria suspended, assisting in the dissolution. We utilize a solution comprising about 10 to 14 M $HNO_3$ having $Hg(NO_3)_2$ added to activate the aluminum, having HF added to aid in the activation and catalyze the thoria dissolution and having $Ni(NO_3)_2$ added to control the rate of aluminum dissolution. This provides for simultaneous dissolution of the aluminum and the thoria. The evolution of gas causes agitation of the thoria, and passivation of the aluminum in concentrated $HNO_3$ is prevented by the action of the HF and $Hg(NO_3)_2$.

While it had been previously known that aluminum could be dissolved in lower concentration nitric acid in the presence of mercury and nickel ions as disclosed in U.S. Patent 3,119,658, granted to Wallace W. Schulz on Jan. 28, 1964, such dissolution was not effective in the concentrations we employ, the aluminum becoming passivated at concentrations above about 8.5 M. Thoria does not dissolve satisfactorily in the concentrations of nitric acid of 7 M, previously employed for dissolving aluminum. Since a considerable amount of nitric acid is consumed in the dissolution, it is necessary to start with nitric acid considerably more concentrated than 8.5 M. We find that the combined presence of $Hg^{+2}$ and $F^-$ ions permits satisfactory dissolution of both the aluminum and the thoria.

Specific embodiments

Several modes of operations are possible in carrying out our process:

(1) Immersion of the fuel elements in a solution of about 12 to 13 M $HNO_3$, 0.005 to 0.04 M Hg, 0.01 to 0.075 M $F^-$ and 0.025 M $Ni^{+2}$.

(2) Activation of the aluminum in a solution which is 7 M $HNO_3$, 0.02 M Hg and 0.10 M $Ni^{+2}$, with later additions of reagents to bring the concentration to 14 M $HNO_3$, 0.02 M $Ni^{+2}$, 0.02 M $Hg^{+2}$ and 0.04 M $F^-$.

(3) Immersion of the fuel elements in a solution which is 10 M $HNO_3$, 0.045 M HF, 0.10 M $Al_2(NO_3)_2$, and 0.05 M $Ni(NO_3)_2$. When the thinner portions of the cladding are dissolved so that a thoria is exposed, 12 to 16 M $HNO_3$ containing HF is added to increase the concentration to at least 8.8 M.

These variations are illustrated by the following specific examples.

Example I

Target elements were utilized which were aluminum cans 8.7 inches long, 1.5 inches outside diameter and 0.045 inch thick, filled with about 6 moles (1400 g.) granular thoria. The aluminum amounted to about 3 moles per can. These target elements were placed in a pilot plant dissolver.

The initial dissolving solution had the following composition: 12 M $HNO_3$, 0.005 M $Hg^{+2}$, 0.025 M $F^-$, 0.025 M $Ni^{+2}$. It was necessary to raise the mercury concentration to 0.04 M and the fluoride concentration to 0.075 M to obtain activation of the aluminum and start its dissolution. The solution was sparged with air. Sufficient aluminum was removed to permit dissolution of the thoria to begin in an hour. However, because the ends caps are thicker than the walls, and because the rate of dissolution of aluminum decreases rapidly with accumulation of aluminum nitrate, aluminum was present throughout the dissolution of the thoria. The vigorous evolution of gas served to keep the fine particles of thoria in suspension. The test was terminated after 11 hours, at which time about 25% of the charge remained undissolved and the dissolution was still in progress.

Example II

The aluminum was activated by treating the target elements with a solution representing 20% of the final volume and having the following composition: 7 M $HNO_3$, 0.02 M $Hg^{+2}$, 0.10 M $Ni^{+2}$.

Later additions of 15.8 M $HNO_3$, mercury and fluoride resulted in a final solution with a composition of 14 M $HNO_3$, 0.02 M $Hg^{+2}$, 0.02 M $Ni^{+2}$ and 0.04 M $F^-$. The solution was sparged as before. The experiment was terminated after 4½ hours, at which time approximately 22% of the charge remained undissolved and dissolution was still proceeding.

Example III

Target elements of the type described in Example I are placed in the dissolver and 6 liters of dissolving solution per target element added. This solution has the composition 10.0 M nitric acid, 0.045 M hydrogen fluoride, 0.10 M aluminum nitrate, 0.012 M mercury (II) nitrate and 0.05 M nickel nitrate. When the thoria is first exposed, the nitric acid concentration is about 8 M and the aluminum nitrate concentration is about 0.6 to 0.7 M.

At these concentrations, dissolution of the thoria would be very slow. An additional charge of 0.2 liter per mole of thorium oxide (1.2 liters per target element) of a solution (12.7 M in nitric acid and 0.045 M in hydrogen fluoride) is added. This gives a composition of 8.8 M nitric acid, 0.045 M hydrogen fluoride and 0.53 M aluminum nitrate. At this concentration the rate of dissolution of thorium oxide is about 3.4 mg./cm.$^2$/min. When 60% of the thoria has dissolved, the rate of dissolution has dropped to about half that value and most of the fines have been dissolved. Since fines are no longer present to form the impervious layer referred to at the beginning of this specification, and to give trouble in the pipelines, the solution is drained at that point, the next batch of target elements added and the process is repeated. The dissolution of the exposed thoria from the first batch proceeds simultaneously with the dissolution of the aluminum of the second. We regard this as the best mode of carrying out our process.

It should be stated that 16 M nitric acid would be preferable to the 12.7 M utilized in Example III so far as the dissolution is concerned. We prefer the 12.7 M because it can be prepared at the plant for which this process was designed.

The embodiments of the invention in which an exclusive property or privilege is claimed are defined as follows:

1. A process for the dissolution of nuclear target elements formed of granular thoria sealed in aluminum containers which comprises immersing said target elements in a solution which is substantially 10 to 14 M $HNO_3$, and which also contains small amounts of $F^-$ ion sufficient to catalyze the dissolution of thoria and aid in the activation of the aluminum. $Hg^{+2}$ ion sufficient, in the presence of said $F^-$ ion, to activate the dissolution of the aluminum, and $Ni^{+2}$ ion sufficient to control the rate of aluminum dissolution.

2. A process as defined in claim 1 wherein said elements are immersed in a solution which is substantially 12 to 13 M $HNO_3$, 0.005 to 0.04 M $Hg^{+2}$ ion, 0.01 to 0.075 M $F^-$ ion, and 0.025 M $Ni^{+2}$ ion, and dissolved therein.

3. A process as defined in claim 1 wherein said elements are first immersed in a solution which is substantially 7 M $HNO_3$, 0.02 M $Hg^{+2}$ and 0.10 $Ni^{+2}$ to activate the aluminum and wherein $HNO_3$, $Hg(NO_3)_2$ and HF are thereafter added in sufficient amounts to bring the solution to substantially 14 M $HNO_3$, 0.02 M $Hg^{+2}$, 0.02 M $Ni^{+2}$ and 0.04 M $F^-$, in which the elements are dissolved.

4. A process as defined in claim 1 comprising immersing the elements in a solution which is substantially 10.0 M $HNO_3$, 0.045 M HF, 0.10 M $Al_2(NO_3)_3$, 0.012 M $Hg(NO_3)_2$, and 0.05 M $Ni(NO_3)_2$, allowing the elements to remain in said solution until the thoria is exposed, then adding a solution which is 12 to 16 M $HNO_3$ and substantially 0.045 M HF in sufficient quantity to bring the solution to at least 8.8 M $HNO_3$ and 0.045 M HF, and continuing the dissolution.

5. A process as defined in claim 4 wherein the solution is drained before the thoria is completely dissolved, a new batch of elements and a new batch of solution of the original strength are added, and the process continued, whereby the last of the thoria of one batch is dissolved simultaneously with the aluminum of a succeeding batch.

References Cited

UNITED STATES PATENTS 3,119,658   11/1967   Schultz _____ 23—324

OTHER REFERENCES

I Hyder et al., Dissolution of Thorium Oxide, July 1966, Savannah River Laboratory Report DP1044.

CARL D. QUARFORTH, *Primary Examiner.*

M. J. McGREAL, *Assistant Examiner.*